United States Patent
McCaffrey

(10) Patent No.: US 10,107,129 B2
(45) Date of Patent: Oct. 23, 2018

(54) BLADE OUTER AIR SEAL WITH SPRING CENTERING

(71) Applicant: United Technologies Corporation, Farmington, CT (US)

(72) Inventor: Michael G. McCaffrey, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 283 days.

(21) Appl. No.: 15/071,274

(22) Filed: Mar. 16, 2016

(65) Prior Publication Data

US 2017/0268372 A1     Sep. 21, 2017

(51) Int. Cl.
| | |
|---|---|
| *F01D 11/16* | (2006.01) |
| *F01D 11/02* | (2006.01) |
| *F01D 11/12* | (2006.01) |
| *F16J 15/44* | (2006.01) |
| *F01D 9/04* | (2006.01) |
| *F01D 11/08* | (2006.01) |
| *F01D 25/24* | (2006.01) |

(52) U.S. Cl.
CPC ............... *F01D 11/16* (2013.01); *F01D 9/04* (2013.01); *F01D 11/025* (2013.01); *F01D 11/08* (2013.01); *F01D 11/122* (2013.01); *F01D 25/246* (2013.01); *F16J 15/445* (2013.01); *F05D 2220/32* (2013.01); *F05D 2230/64* (2013.01); *F05D 2240/55* (2013.01); *F05D 2300/6033* (2013.01); *Y02T 50/672* (2013.01)

(58) Field of Classification Search
CPC ........................................................ F01D 11/16
See application file for complete search history.

(56) References Cited

U.S. PATENT DOCUMENTS

| | | |
|---|---|---|
| 4,087,199 A | 5/1978 | Hemsworth et al. |
| 4,527,385 A | 7/1985 | Jumelle et al. |
| 4,728,257 A | 3/1988 | Handschuh |
| 5,609,469 A | 3/1997 | Worley et al. |
| 5,639,210 A | 6/1997 | Carpenter et al. |
| 6,142,731 A | 11/2000 | Dewis et al. |

(Continued)

FOREIGN PATENT DOCUMENTS

| | | |
|---|---|---|
| WO | 2015038341 | 3/2015 |
| WO | 2015038906 | 3/2015 |

(Continued)

OTHER PUBLICATIONS

Extended European Search Report for European Patent Application No. 17160069.5 dated Jul. 26, 2017.

*Primary Examiner* — Eldon Brockman
(74) *Attorney, Agent, or Firm* — Carlson, Gaskey & Olds, P.C.

(57) ABSTRACT

A seal assembly includes a seal arc segment that has first and second seal supports. A carriage has first and second support members. The first support member supports the seal arc segment in a first ramped interface and the second support member supports the seal arc segment in a second ramped interface such that the seal arc segment is circumferentially moveable with respect to the carriage. First and second opposed springs bias the seal arc segment toward a circumferential default position.

16 Claims, 3 Drawing Sheets

(56) References Cited

U.S. PATENT DOCUMENTS

| | | |
|---|---|---|
| 6,406,256 B1 | 6/2002 | Marx |
| 6,431,825 B1 | 8/2002 | McLean |
| 6,726,448 B2 | 4/2004 | McGrath et al. |
| 6,733,235 B2 | 5/2004 | Alford et al. |
| 7,052,235 B2 | 5/2006 | Alford et al. |
| 7,163,206 B2 | 1/2007 | Cross et al. |
| 7,435,049 B2 | 10/2008 | Ghasripoor et al. |
| 7,527,472 B2 | 5/2009 | Allen |
| 7,959,407 B2 | 6/2011 | Tholen |
| 8,123,466 B2 | 2/2012 | Pietraszkiewicz et al. |
| 8,303,247 B2 | 11/2012 | Schlichting et al. |
| 8,439,636 B1 | 5/2013 | Liang |
| 8,534,995 B2 | 9/2013 | McCaffrey |
| 8,568,091 B2 | 10/2013 | McCaffrey |
| 8,585,357 B2 | 11/2013 | DiPaola et al. |
| 8,596,963 B1 | 12/2013 | Liang |
| 8,790,067 B2 | 7/2014 | McCaffrey et al. |
| 8,876,458 B2 | 11/2014 | Thibodeau et al. |
| 8,920,127 B2 | 12/2014 | McCaffrey |
| 8,944,756 B2 | 2/2015 | Lagueux |
| 9,039,358 B2 | 5/2015 | Tholen et al. |
| 9,115,596 B2 | 8/2015 | Clouse |
| 9,169,739 B2 | 10/2015 | Mironets et al. |
| 9,200,530 B2 | 12/2015 | McCaffrey |
| 9,228,447 B2 | 1/2016 | McCaffrey |
| 9,353,649 B2 * | 5/2016 | Rioux ................... F01D 25/246 |
| 2003/0202876 A1 * | 10/2003 | Jasklowski ........... F01D 11/025 415/135 |
| 2006/0038358 A1 | 2/2006 | James |
| 2006/0067813 A1 | 3/2006 | Allan et al. |
| 2008/0211192 A1 | 9/2008 | Pietraszkiewicz et al. |
| 2009/0096174 A1 | 4/2009 | Spangler et al. |
| 2009/0169368 A1 | 7/2009 | Schlichting et al. |
| 2009/0208322 A1 | 8/2009 | McCaffrey |
| 2010/0226760 A1 | 9/2010 | McCaffrey |
| 2011/0044803 A1 | 2/2011 | Di Paola et al. |
| 2011/0044804 A1 | 2/2011 | DiPaola et al. |
| 2012/0076659 A1 * | 3/2012 | Robertson ............... B01D 46/02 416/219 R |
| 2012/0195743 A1 | 8/2012 | Walunj et al. |
| 2012/0275898 A1 | 11/2012 | McCaffrey et al. |
| 2013/0017057 A1 | 1/2013 | Lagueux |
| 2013/0022469 A1 | 1/2013 | McCaffrey |
| 2013/0113168 A1 | 5/2013 | Lutjen et al. |
| 2013/0209240 A1 | 8/2013 | McCaffrey |
| 2014/0016761 A1 | 1/2014 | Werner |
| 2014/0017072 A1 | 1/2014 | McCaffrey |
| 2014/0023480 A1 | 1/2014 | McCaffrey |
| 2014/0033149 A1 | 1/2014 | Groves et al. |
| 2014/0044528 A1 | 2/2014 | Clouse |
| 2014/0053040 A1 | 2/2014 | Hargan |
| 2014/0127006 A1 | 5/2014 | Romanov et al. |
| 2014/0133955 A1 | 5/2014 | McCaffrey et al. |
| 2014/0186152 A1 | 7/2014 | McCaffrey et al. |
| 2015/0016954 A1 | 1/2015 | Thibodeau et al. |
| 2015/0031764 A1 | 1/2015 | Kraus et al. |
| 2015/0226132 A1 | 8/2015 | Roy Thill et al. |
| 2015/0337672 A1 | 11/2015 | McCaffrey et al. |
| 2015/0369076 A1 | 12/2015 | McCaffrey et al. |
| 2016/0003078 A1 | 1/2016 | Stevens et al. |
| 2016/0003080 A1 | 1/2016 | Mcgarrah |
| 2016/0090866 A1 * | 3/2016 | Hurst ................... F01D 25/246 415/173.1 |
| 2016/0333716 A1 * | 11/2016 | McCaffrey ............ F01D 11/16 |

FOREIGN PATENT DOCUMENTS

| | | |
|---|---|---|
| WO | 2015047478 | 4/2015 |
| WO | 2015061108 | 4/2015 |
| WO | 2015088656 | 6/2015 |
| WO | 2015109292 | 7/2015 |
| WO | 2015112354 | 7/2015 |

* cited by examiner

BLADE OUTER AIR SEAL WITH SPRING CENTERING

BACKGROUND

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged. The arc segments may be abradable to reduce the radial gap with the tips of the blades.

SUMMARY

A seal assembly according to an example of the present disclosure includes a seal arc segment that defines first and second seal supports, and a carriage that defines first and second support members. The first support member supports the seal arc segment in a first ramped interface and the second support member supports the seal arc segment in a second ramped interface such that the seal arc segment is circumferentially moveable with respect to the carriage. First and second opposed springs bias the seal arc segment toward a circumferential default position.

In a further embodiment of any of the foregoing embodiments, the first and second opposed springs are leaf springs.

In a further embodiment of any of the foregoing embodiments, the first and second opposed springs bias the seal arc segment at, respectively, the first and second seal supports.

A further embodiment of any of the foregoing embodiments includes at least one shim between the seal arc segment and the first and second springs such that the first and second springs bias the seal arc segment through the at least one shim.

In a further embodiment of any of the foregoing embodiments, the first spring biases the seal arc segment in a first circumferential direction and the second spring biases the seal arc segment in a second, opposite circumferential direction.

A further embodiment of any of the foregoing embodiments includes a third spring biasing the seal arc segment in a radial direction.

In a further embodiment of any of the foregoing embodiments, the third spring is a leaf spring.

In a further embodiment of any of the foregoing embodiments, the carriage includes first and second deflection limiters adjacent, respectively, the first and second springs. The first and second deflection limiters limit low-load elastic movement of the first and second springs.

In a further embodiment of any of the foregoing embodiments, the carriage includes third and fourth deflection limiters radially adjacent, respectively, the first and second deflection limiters. The third and fourth deflection limiters limit high-load elastic movement of the first and second springs.

In a further embodiment of any of the foregoing embodiments, the carriage includes first and second deflection limiters adjacent, respectively, the first and second springs. Each of the first and second deflection limiters include a protrusion with a curved bearing surface.

In a further embodiment of any of the foregoing embodiments, the first and second springs each provide non-linear spring force.

A gas turbine engine according to an example of the present disclosure includes a rotor section that has a rotor with a plurality of blades and at least one annular seal assembly circumscribing the rotor. The annular seal assembly includes at least one seal arc segment defining first and second seal supports, and at least one carriage defines first and second support members. The first support member supports the at least one seal arc segment in a first ramped interface and the second support member supports the at least one seal arc segment in a second ramped interface such that the at least one seal arc segment is circumferentially moveable with respect to the at least one carriage. First and second opposed springs bias the at least one seal arc segment toward a circumferential default position.

In a further embodiment of any of the foregoing embodiments, the first and second opposed springs bias the seal arc segment at, respectively, the first and second seal supports.

In a further embodiment of any of the foregoing embodiments, the first spring biases the seal arc segment in a first circumferential direction and the second spring biases the seal arc segment in a second, opposite circumferential direction.

A further embodiment of any of the foregoing embodiments includes a third spring biasing the seal arc segment in a radial direction.

In a further embodiment of any of the foregoing embodiments, the carriage includes first and second deflection limiters adjacent, respectively, the first and second springs. The first and second deflection limiters limit low-load elastic movement of the first and second springs.

In a further embodiment of any of the foregoing embodiments, the carriage includes third and fourth deflection limiters radially adjacent, respectively, the first and second deflection limiters. The third and fourth deflection limiters limit high-load elastic movement of the first and second springs.

In a further embodiment of any of the foregoing embodiments, the first and second springs each provide non-linear spring force.

A method for maintaining positioning in seal assembly according to an example of the present disclosure includes mounting a seal arc segment in a carriage on first and second ramped interfaces such that the seal arc segment is circumferentially moveable with respect to the carriage, and using first and second opposed springs to bias the seal arc segment toward a circumferential default position.

In a further embodiment of any of the foregoing embodiments, the first and second opposed springs bias the seal arc segment at, respectively, first and second seal supports of the seal arc segment.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
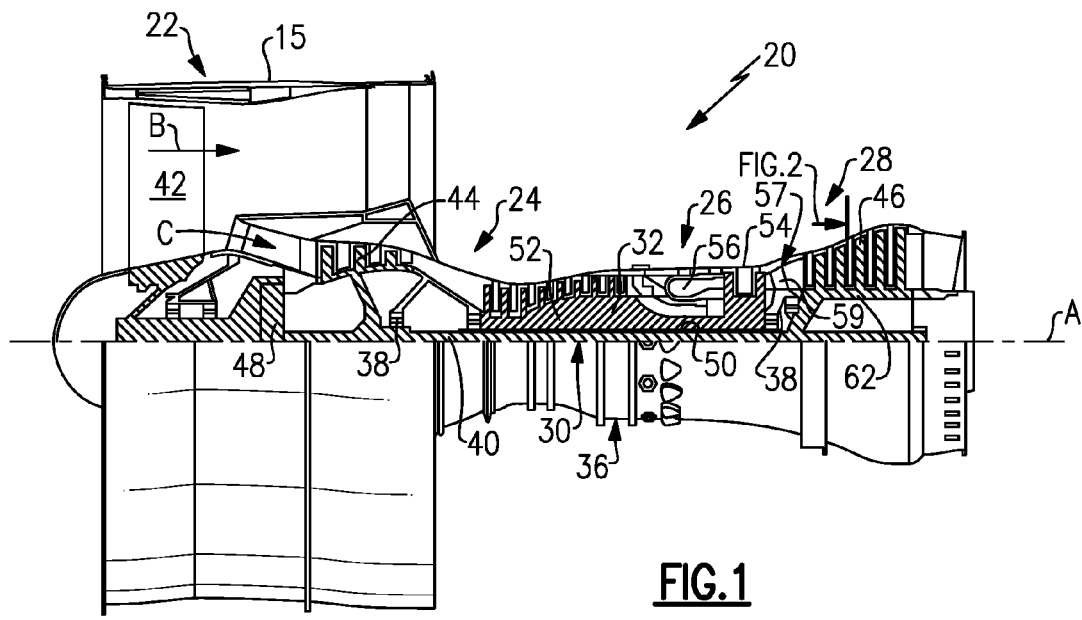
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
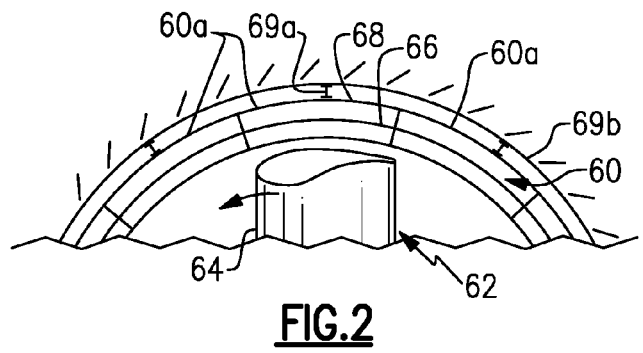
FIG. 2 illustrates an axial view of a seal assembly of a gas turbine engine.

FIG. 2 illustrates a partial axial view through a portion of one of the stages of the turbine section 28. In this example, the turbine section 28 includes an annular blade outer air seal (BOAS) system or assembly 60 (hereafter BOAS 60) that is located radially outwards of a rotor 62 that has a row of rotor blades 64. As can be appreciated, the BOAS 60 can alternatively or additionally be adapted for other portions of the engine 20, such as the compressor section 24. The BOAS 60 includes a plurality of segments 60a that are circumferentially arranged in an annulus around the central axis A of the engine 20. Each of the segments 60a generally includes a seal arc segment 66 that is mounted in a carriage 68. Each carriage 68 is mounted through one or more connections 69a to a case structure 69b. The BOAS 60 is in close radial proximity to the tips of the blades 64, to reduce the amount of gas flow that escapes around the blades 64.

Figure 3:
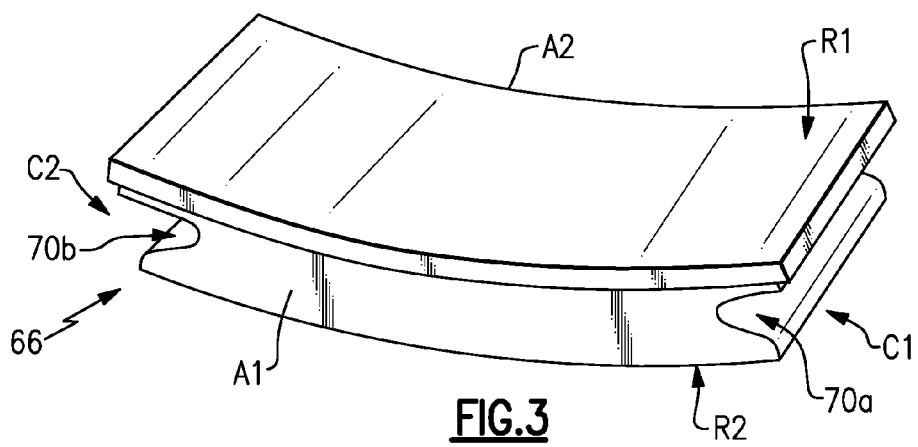
FIG. 3 illustrates an isolated view of a seal arc segment of a seal assembly.
Figure 4:
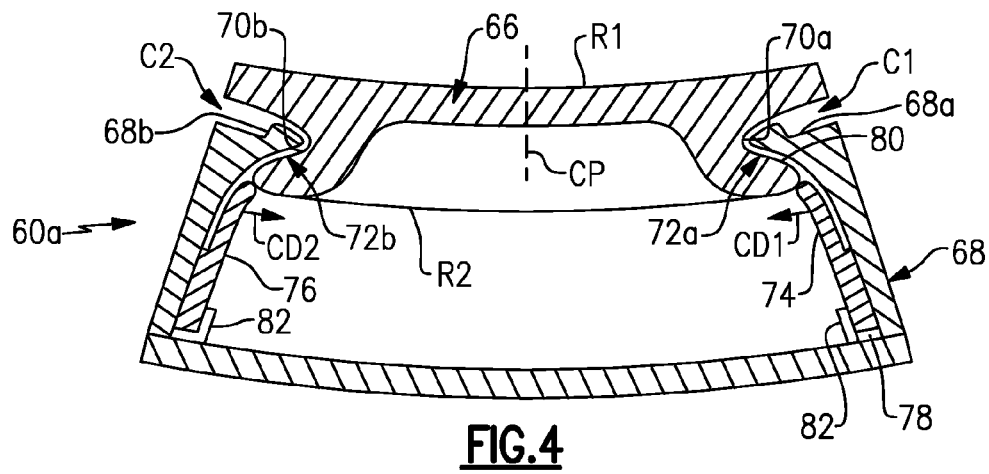
FIG. 4 illustrates an axial view of a segment of a seal assembly.

FIG. 3 illustrates an isolated view of a representative one of the seal arc segments 66, and FIG. 4 illustrates an isolated view of a representative one of the segments 60a of the BOAS 60, including the carriage 68 and seal arc segment 66. As will be appreciated, the examples herein may be used to provide compliant, low-stress mounting of the seal arc segment 66 in the carriage 68. In particular such compliant low-stress mounting may be useful for seal arc segments 66 formed of materials that are sensitive to stress concentrations, although this disclosure is not limited and other types of seals and materials will also benefit.

Although not limited, the seal arc segments 66 (i.e., the body thereof) may be monolithic bodies that are formed of a high thermal-resistance, low-toughness material. For example, the seal arc segments 66 may be formed of a high thermal-resistance low-toughness metallic alloy or a ceramic-based material, such as a monolithic ceramic or a ceramic matrix composite. One example of a high thermal-resistance low-toughness metallic alloy is a molybdenum-based alloy. Monolithic ceramics may be, but are not limited to, silicon carbide (SiC) or silicon nitride ($Si_3N_4$). Alternatively, the seal arc segments 66 may be formed of high-toughness material, such as but not limited to metallic alloys.

Each seal arc segment 66 is a body that defines radially inner and outer sides R1/R2, first and second circumferential ends C1/C2, and first and second axial sides A1/A2. The radially inner side R1 faces in a direction toward the engine central axis A. The radially inner side R1 is thus the gas path side of the seal arc segment 66 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In this example, the first and second circumferential ends C1/C2 define, respectively, first and second seal supports 70a/70b by which the carriage 68 radially supports or suspends the seal arc segment 66. The seal arc segment 66 is thus end-mounted. In the example shown, the first and second seal supports 70a/70b have a dovetail geometry.

The carriage 68 includes first and second support members 68a/68b that serve to radially support the seal arc segment 66 via, respectively, the first and second seal supports 70a/70b. In the example shown, the first and second support members 68a/68b are hook supports that interfit with the dovetail geometry of the first and second seal supports 70a/70b.

The first support member 68a supports the seal arc segment 66 in a first ramped interface 72a and the second support member 68b supports the seal arc segment 66 in a second ramped interface 72b. For instance, each of the ramped interfaces 72a/72b includes at least one ramped surface on the seal arc segment, the carriage 68, or both. In the example shown, the surfaces of the first and second seal supports 70a/70b and the surfaces of the first and second support members 68a/68b are ramped. The term "ramped" as used herein refers to a support surface that is sloped with respect to both the radial and circumferential directions.

The ramped interfaces 72a/72b permit the seal arc segment 66 to move circumferentially with respect to the carriage 68 as the seal arc segment 66 slides up and down the ramped interfaces 72a/72b. Friction in the ramped interfaces 72a/72b during sliding movement can potentially provide damping, and the relatively large contact area across the ramped interfaces 72a/72b distributes loads transferred through the ramped interfaces 72a/72b, which also serves to potentially reduce stress concentrations on the seal arc segment 66.

Although the seal arc segment 66 can move circumferentially when subjected to forces with circumferential force components, the seal arc segment 66 is biased to a default position. In this regard, each of the carriages 68 includes first and second opposed springs 74/76 that bias the seal arc segment 66 toward a circumferential default position. For example, the circumferential default position is a circumferentially centered position in the carriage 68, as represented at CP. The first spring 74 biases the seal arc segment 66 in a first circumferential direction CD1, and the second spring 76 biases the seal arc segment 66 in a second, opposite circumferential direction CD2. Thus, when or if the seal arc segment 66 circumferentially moves against the bias force of one of the springs 74 or 76, the spring 74 or 76 serves to move the seal arc segment 66 back toward the default position. As an example, blade rub events, vibration during engine operation, or vibration during non-operation may cause circumferential movement. The springs 74 and 76 thus serve to re-position or re-center the seal arc segment 66 to the default circumferential position.

In the example shown, the springs 74/76 are radially-oriented leaf springs that each include a radially outer end 78 and a radially inner end 80. The carriage 68 includes a mount 82 that secures the radially outer end 78 such that the springs 74/7 are cantilevered from their radially outer ends 78. For example, the mount 82 is a slot that receives and holds the radially outer end 78. The mount 82 may rigidly secure and hold the radially outer end 78 or, alternatively loosely secure and hold the radially outer end 78 such that there is some play between the radially outer end 78 and the slot. The radially inner end 80 is adjacent the first seal support 70a (for spring 74) or the second seal support 70b (for spring 76). The springs 74/76 deflect or bend from the secured radially outer ends 78 to provide spring forces that bias the seal arc segment 66 at the first and second seal supports 70a/70b.

Figure 5A:
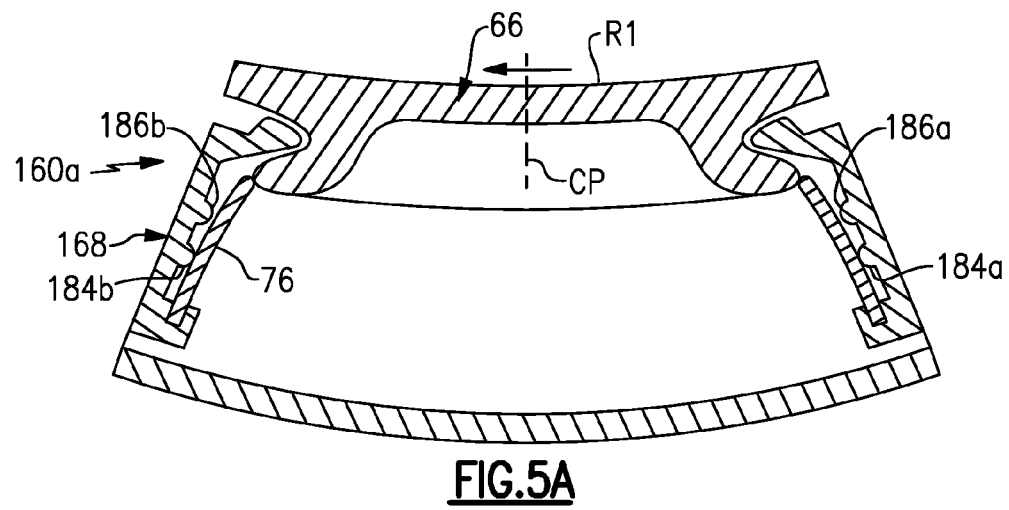
FIG. 5A illustrates an axial view of another example of a segment of a seal assembly that has deflection limiters.

FIG. 5A illustrates another example of a segment 160a that includes a carriage 168. The carriage 168 is similar to carriage 68 but includes first and second deflection limiters 184a/184b adjacent, respectively, the first and second springs 74/76. In the absence of any deflection of the springs 74/76, the first and second deflection limiters 184a/184b are spaced apart from the respective springs 74/76. The first and second deflection limiters 184a/184b limit low-load elastic movement of the first and second springs 74/76, as will be described in further detail below. Optionally, the carriage 168 can also include third and fourth deflection limiters 186a/186b radially adjacent, respectively, the first and second deflection limiters 184a/184b. The third and fourth deflection limiters 186a/186b limit high-load elastic movement of the first and second springs 74/76.

Figure 5B:
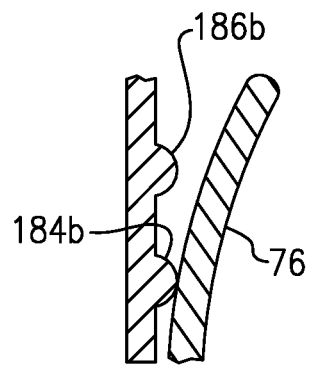
FIG. 5B illustrates an isolated view of a spring and deflection limiters.
Figure 5C:
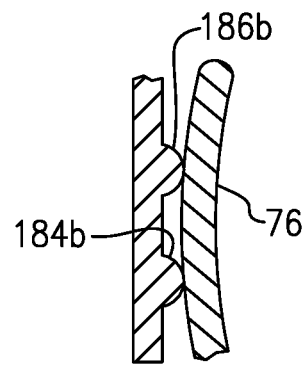
FIG. 5C illustrates an isolated view of the spring and deflection limiters of FIG. 5B but in a further elastically deflected state.

FIG. 5B shows an isolated view of the spring 76 and the portion of the carriage 168 with the deflection limiters 184b and 186b. Upon elastic deflection of the spring 76 (i.e., the seal arc segment 66 moves to the left in FIG. 5A) under a relatively low load the spring 76 abuts the deflection limiter 184b. The deflection limiter 184b thus resists further movement of the spring 76. However, since the deflection limiter 184b is proximate to the secured radially outer end 78 of the spring 76, the portion of the spring 76 toward the tip can still deflect, but only with application of a relatively greater load since the fulcrum of the bending movement of the spring 76 is now at the deflection limiter 184b rather than the radially outer end 78. Upon elastic deflection of the spring 76 under such a greater load as shown in FIG. 5C, the spring 76 abuts the deflection limiter 186b. The deflection limiter 186b thus resists further movement of the spring 76 under that greater load. The deflection limiters 184b and 186b thus permit the spring to provide a non-linear spring force response, i.e., a low spring force until the spring 76 abuts the deflection limiter 184b and a high spring force until the spring 76 abuts the deflection limiter 186b. The spring 74 operates similarly with respect to deflection limiters 184a and 186a.

Figure 5D:
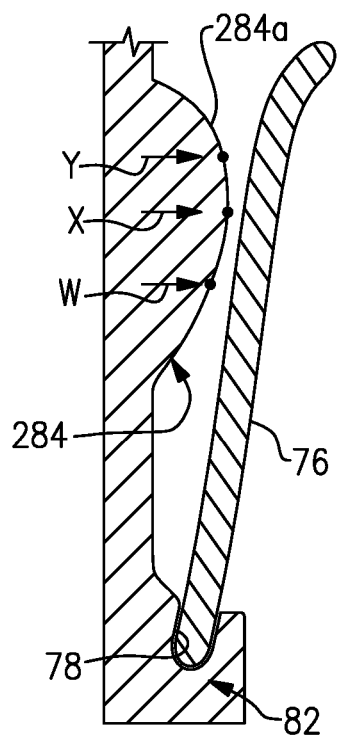
FIG. 5D illustrates an isolated view of a spring and another example of a deflection limiter.
Figure 5E:
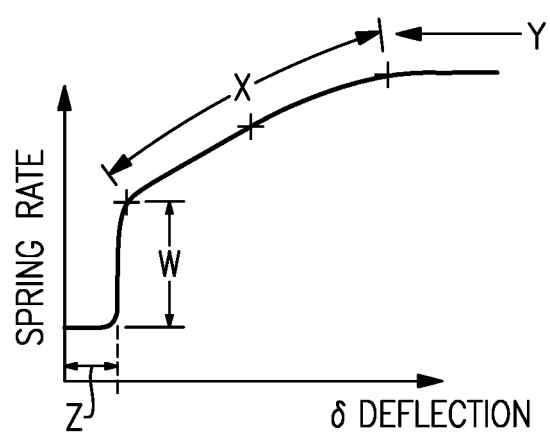
FIG. 5E graphically illustrates a change in spring rate over a range of spring deflection.

FIG. 5D shows an isolated view of the spring 76 and another example of a deflection limiter 284. In this example, the deflection limiter 284 is a protrusion that has a curved bearing surface 284a. As the spring 76 deflects and contacts the bearing surface 284a, the curvature of the bearing surface 284a progressively and smoothly changes the spring rate. As an example, FIG. 5E graphically illustrates the change in spring rate over a range of spring deflection. Initially, before any contact between the spring 76 and the deflection limiter 284, the spring 76 has a default spring rate, represented at Z. Upon sufficient deflection, the spring 76 initially contacts the deflection limiter 284 at point W. The contact at point W creates a new, shorter fulcrum about which the spring 76 deflects, which changes the spring rate as shown in the graph. With further deflection, the spring 76 contacts point X and then point Y on the bearing surface 284a, progressively shortening the fulcrum and further changing the spring rate as shown in the graph.

Figure 6:
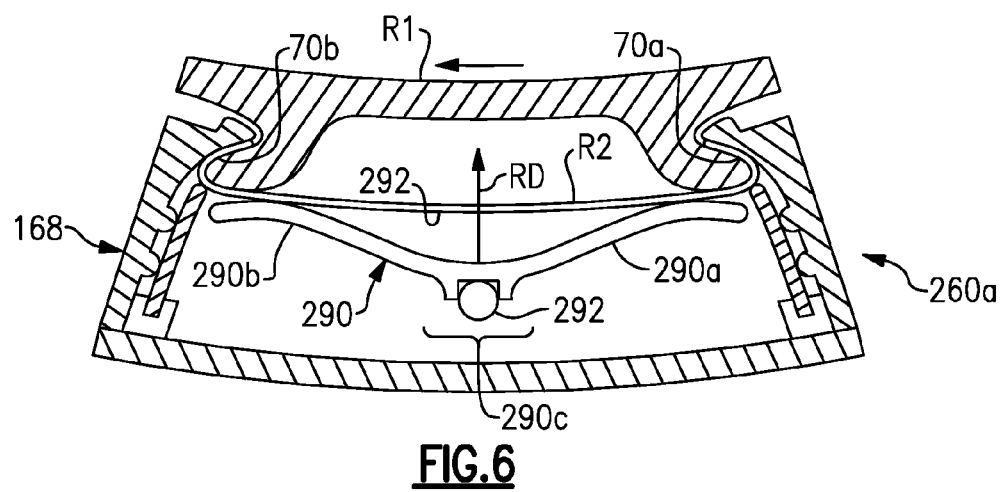
FIG. 6 illustrates an axial view of another example of a segment of a seal assembly that has a third spring.

FIG. 6 illustrates another example of a segment 260a that is similar to the segment 160a but additionally includes a third spring 290. In this example, the third spring 290 is a circumferentially-oriented leaf spring that biases the seal arc segment 66 in a radial direction, as represented at RD. The third spring 290 includes first and second arms 290a/290b that extend in opposed circumferential directions from a central spring portion 290c. The central spring portion 290c is mounted on a reaction member 292, such as a fastener or post, which is rigidly fixed with the carriage 168 or other static structure. The first and second arms 290a/290b react or bend from the central spring portion 290c to exert a radial bias force on the seal arc segment 66. The radial bias force, applied evenly to the circumferential ends C1/C2 of the seal arc segment 66, tends to cause the seal arc segment 66 to slide on the ramped interfaces 72a/72b toward the circumferentially centered position CP when the seal arc segment 66 is off-center. The third spring 290 thus serves as a secondary, self-centering feature.

In this example, the segment 260a also includes one or more shims 292. As shown, there is a single shim 292, although the shim 292 could alternatively be segmented into several pieces. The shim 292 generally conforms to the radially outer side R2 of the seal arc segment 66 such that the shim 292 wraps around the first and second seal supports 70a/70b. In one example, the shim 292 partially conforms to the geometry of the radially outer side R2 of the seal arc segment 66 such that there are gaps between the shim 292 and the seal arc segment 66. The partial conformation permits the shim 292 to deflect and/or move without necessarily deflecting or moving the seal arc segment 66. Thus, the shim 292 contributes additional compliance in the mounting of the seal arc segment 66.

The shim 292 also serves to protect the seal arc segment 66 from wear and point stress concentrations. For example, the springs 74/76/290 contact the shim 292 rather than directly contacting the seal arc segment 66. Thus, the shims 292 bear the friction and wear with the springs 74/76/290. The loads exerted by the springs 74/76/290 are also transferred through the shim 292. In this regard, the shim 292 may deflect and distribute the load across the seal arc segment 66, thereby potentially reducing point stresses directly on the seal arc segment 66.

The examples herein also illustrate a method for maintaining positioning in the BOAS 60. For example, the method includes mounting the seal arc segment 66 in the carriage 68/168 on the first and second ramped interfaces 72a/72b such that the seal arc segment 66 is circumferentially moveable with respect to the carriage 68/168, and using the first and second opposed springs 74/76 to bias the seal arc segment 66 toward the circumferential default position, such as the circumferentially centered position CP. The springs 74/76 bias the seal arc segment 66 at, respectively, the first and second seal supports 70a/70b of the seal arc segment 66. The springs 74/76 thus serve to maintain the position of the seal arc segment 66 in the default position. Prior to mounting of the seal arc segment 66, the springs 74/76 may be mounted in the respective mounts 82 in the carriage 68/168 and then deflected into contact with the respective deflection limiter 184a/284 to permit insertion of the seal arc segment 66 into the carriage 68/168. The deflection limiter 184a/284 thus also serve to facilitate assembly by acting as a mechanical stop that is indicative to an installer that the springs 76 have been sufficiently deflected for insertion of the seal arc segment 66.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A blade outer air seal assembly comprising:
a seal arc segment defining first and second seal supports;
a carriage defining first and second support members, the first support member supporting the seal arc segment in a first ramped interface and the second support member supporting the seal arc segment in a second ramped interface such that the seal arc segment is circumferentially moveable with respect to the carriage; and
first and second opposed springs biasing the seal arc segment toward a circumferential default position, the carriage including first and second deflection limiters and third and fourth deflection limiters, the first and second deflection limiters adjacent, respectively, the first and second springs, the first and second deflection limiters limiting low-load elastic movement of the first and second springs, the third and fourth deflection limiters radially adjacent, respectively, the first and second deflection limiters, the third and fourth deflection limiters limiting high-load elastic movement of the first and second springs.

2. The seal assembly as recited in claim 1, wherein the first and second opposed springs are leaf springs.

3. The seal assembly as recited in claim 1, wherein the first and second opposed springs bias the seal arc segment at, respectively, the first and second seal supports.

4. The seal assembly as recited in claim 3, further comprising at least one shim between the seal arc segment and the first and second springs such that the first and second springs bias the seal arc segment through the at least one shim.

5. The seal assembly as recited in claim 1, wherein the first spring biases the seal arc segment in a first circumferential direction and the second spring biases the seal arc segment in a second, opposite circumferential direction.

6. The seal assembly as recited in claim 1, further comprising a third spring biasing the seal arc segment in a radial direction.

7. The seal assembly as recited in claim 6, wherein the third spring is a leaf spring.

8. The seal assembly as recited in claim 1, wherein each of the first and second deflection limiters comprises a protrusion with a curved bearing surface.

9. The seal assembly as recited in claim 1, wherein the first and second springs each provide non-linear spring force.

10. A gas turbine engine comprising:
a rotor section including a rotor having a plurality of blades and at least one annular seal assembly circumscribing the rotor, the annular seal assembly comprising:
at least one seal arc segment defining first and second seal supports;
at least one carriage defining first and second support members, the first support member supporting the at least one seal arc segment in a first ramped interface and the second support member supporting the at least one seal arc segment in a second ramped interface such that the at least one seal arc segment is circumferentially moveable with respect to the at least one carriage; and
first and second opposed springs biasing the at least one seal arc segment toward a circumferential default position, the at least one carriage including first and second deflection limiters and third and fourth deflection limiters, the first and second deflection limiters adjacent, respectively, the first and second springs, the first and second deflection limiters limiting low-load elastic movement of the first and second springs, the third and fourth deflection limiters radially adjacent, respectively, the first and second deflection limiters, the third and fourth deflection limiters limiting high-load elastic movement of the first and second springs.

11. The gas turbine engine as recited in claim 10, wherein the first and second opposed springs bias the seal arc segment at, respectively, the first and second seal supports.

12. The gas turbine engine as recited in claim 10, wherein the first spring biases the seal arc segment in a first circumferential direction and the second spring biases the seal arc segment in a second, opposite circumferential direction.

13. The gas turbine engine as recited in claim 10, further comprising a third spring biasing the seal arc segment in a radial direction.

14. The gas turbine engine as recited in claim 10, wherein the first and second springs each provide non-linear spring force.

15. A method for maintaining positioning in a blade outer air seal assembly, the method comprising:
mounting a seal arc segment in a carriage on first and second ramped interfaces such that the seal arc segment is circumferentially moveable with respect to the carriage;
using first and second opposed springs to bias the seal arc segment toward a circumferential default position;
using first and second deflection limiters of the carriage that are adjacent, respectively, the first and second springs, to limit low-load elastic movement of the first and second springs; and
using third and fourth deflection limiters of the carriage that are radially adjacent, respectively, the first and second deflection limiters, to limit high-load elastic movement of the first and second springs.

16. The method as recited in claim 15, wherein the first and second opposed springs bias the seal arc segment at, respectively, first and second seal supports of the seal arc segment.

* * * * *